United States Patent [19]

Prince

[11] 4,256,166

[45] Mar. 17, 1981

[54] TIE BAR ADJUSTMENT SYSTEM

[75] Inventor: Edgar D. Prince, Holland, Mich.

[73] Assignee: Prince Corporation, Holland, Mich.

[21] Appl. No.: 2,612

[22] Filed: Jan. 11, 1979

[51] Int. Cl.³ .............................................. B22D 17/26
[52] U.S. Cl. ...................................... 164/154; 74/405; 164/303
[58] Field of Search ........................ 164/154, 303, 312; 425/589; 74/405

[56] References Cited

U.S. PATENT DOCUMENTS

| 2,484,344 | 10/1949 | Hiller et al. | 164/312 |
| 4,187,734 | 2/1980 | Mann | 74/405 |

FOREIGN PATENT DOCUMENTS 1341250 9/1963 France ........................................ 74/405

*Primary Examiner*—Robert D. Baldwin
*Attorney, Agent, or Firm*—Price, Heneveld, Huizenga & Cooper

[57] ABSTRACT

A system for individually adjusting tie bars of a die casting machine during operation includes a threaded sleeve securing one end of each of the threadless tie bars to a backing plate with an adjustment nut positioned between the backing plate and threaded sleeve for adjusting the machine lockup tension on the tie bar. The adjustment nut associated with each of the four tie bars has gear teeth and can be adjusted by means of disengagable idler gears commonly engaging a centrally located bull gear for selectively adjusting one or more of the tie bars. In one embodiment of the invention, strain gauges are placed on the threaded sleeves for detecting the lockup force applied to the tie bars through the sleeves and an electrical control circuit is employed for automatically controlling the tie bar adjustment mechanism to maintain tie bar tension within prescribed limits during production operation of the die casting machine.

16 Claims, 5 Drawing Figures

TIE BAR ADJUSTMENT SYSTEM

BACKGROUND OF THE INVENTION

The present invention relates to die casting machines and particularly to a system for adjusting the tie bar tension.

In die casting machines which frequently operate on an almost continuous basis during operation, it is important that the tie bar tension remain within preselected limited to maintain quality castings and to prevent excessive wear on dies and the machine itself. During operation of die casting machines, even if the initial preset tie bar tension is accurately provided for the desired operation of the machine, the tie bar tension varies due largely to the heating effect of molten shot on the dies. Thus, for example, a cold machine is set up for a lockup force depending upon the size of the machine and the material being cast but which, for example, might be in the order of 2000 tons total with 500 tons being shared for each of the four tie bars typically employed in a die casting machine. During use of the machine where molten metal is injected into dies, the machine gradually heats. It has been found that for a typical 72 inch die, for example, a temperature rise of 100° F. can increase the die thickness by as much as 0.045 inch. This can cause the preselected tensil force on the tie bars to change dramatically resulting in uneven closing of the die in the event the tension shared by the tie bars becomes significantly uneven or undesired lockup forces result, causing bad castings. The casting metal then can flash from the mold and coin into the die face which also shortens the die life.

With conventional die casting machines, although monitoring systems to determine tie bar tension have been used, it is necessary to manually and individually adjust each of the tie bars during the course of a day's operation to assure casting quality remains relatively constant with changing temperatures and, thus, tension on the tie bars of the machine. This, naturally, shuts down operation of the machinery and is costly in terms of lost production and use of manpower.

SUMMARY OF THE INVENTION

Thus, there exists a need in the die casting industry for a system for automatically adjusting tie bar tension with control means which do not render the machine out of service for any significant period of time. The apparatus of the present invention satisfies this need by providing an automatic tie bar adjusting system whereby means are provided for selectively and automatically adjusting the tie bar tension within prescribed limits to compensate for changes in tension during operation and for initially setting up the operational parameters for the machine. In one embodiment of the present invention, a relatively large centrally located bull gear is positioned between spaced tie bars at the corners of a generally rectangular end plate and disengagable idler gears couple the bull gear to each of the adjustment nuts associated with the threaded sleeves of the threadless tie bars for selectively adjusting one or more of the tie bars at the same time. In a preferred embodiment of the invention, strain gauges are mounted to the threaded sleeve associated with each tie bar for measuring the compression of the sleeve during machine lockup and thereby the tension on the tie bars and electrical circuit means are provided for detecting the measured tension and controlling the tie bar adjustment mechanism automatically to maintain the tie bars within preset upper and lower tension limits.

With such a system, therefore, it is possible to automatically adjust the tie bar tension between casting cycles such that during changing operational conditions, the tie bar tension remains within prescribed limits individually and collectively to assure uniform quality castings and to lengthen the life of the machine and dies employed with the machine.

These and other features, advantages, and objects of the present invention will be best understood by reference to the following description thereof together with the drawings, in which:

DETAILED DESCRIPTION OF THE PREFERRED EMBODIMENT

Figure 1:
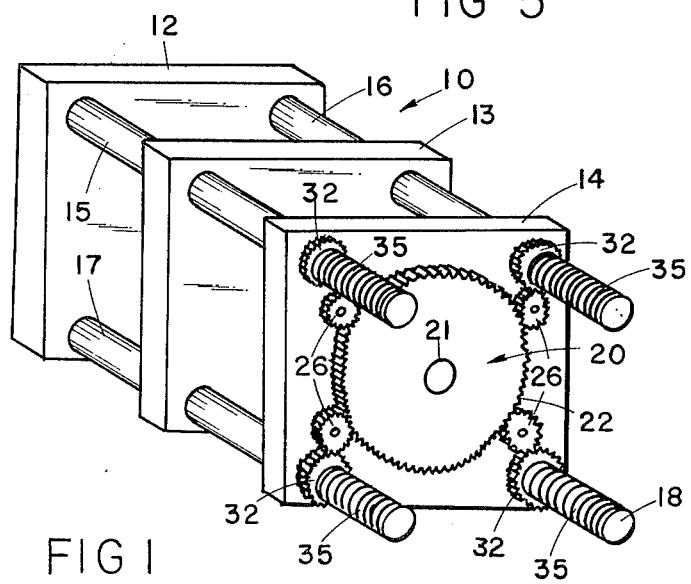
FIG. 1 is a fragmentary perspective and pictoral view of a die casting machine incorporating the present invention.

Referring initially to FIG. 1, there is shown in pictoral form a die casting machine 10 incorporating the present invention. The die casting machine includes a front stationary plate 12, a rear stationary plate 14, and a movable plate 13 positioned between the front and rear plates and movable therebetween. On the rearward facing surface of the front plate 12, there is attached one half of a die (not shown) while the corresponding mating half of the die is mounted on the front surface of movable plate 13. Plate 13 is slidably mounted on four spaced threadless tie bars 15, 16, 17, and 18 which are secured at one end to plate 12 and at the opposite end to rear plate 14 by means of threaded sleeves and collars as described in greater detail below in conjunction with FIG. 3.

The die casting machine 10 also includes a hydraulic ram coupled between the rear plate 14 and a toggle linkage (not shown) extending between the rear plate 14 and movable plate 13 for advancing the movable plate into a locked up casting position with the die closed and for retracting the movable plate 13 away from plate 12 opening the die for removal of the cast part. The die casting machine 10 is of the same general type as that disclosed in U.S. Pat. No. 3,407,685, issued Oct. 29, 1968, To E. D. Prince, assigned to the present assignee, and the disclosure of which is incorporated herein by reference.

Mounted to the rear surface of rear plate 14 for rotation in a conventional fashion by means of an axle 21 is a bull gear 20 having outwardly extending peripheral teeth 22. Teeth 22 of the centrally located bull gear engage longitudinally movable idler gears 26 each associated with one of the four tie bars. Gears 26 in turn selectively engage adjustment nuts 32 which in turn engage the threaded sleeves 19 associated with each of the tie bars such that when bull gear 20 rotates and the idler gear 26 is engaged with the associated adjustment nut 32, the tie bar lockup tension will be changed by rotation of the bull gear. The tension adjustment to the tie bars is accomplished during the die open position of operation while the result of the adjustment is monitored during lockup. A detailed description of the adjustment mechanisms for each tie bar of the die casting machine 10 is now presented in conjunction with FIGS. 2 and 3, it being understood that the mechanism is identical for each of the four tie bars shown in FIG. 1.

Figure 3:
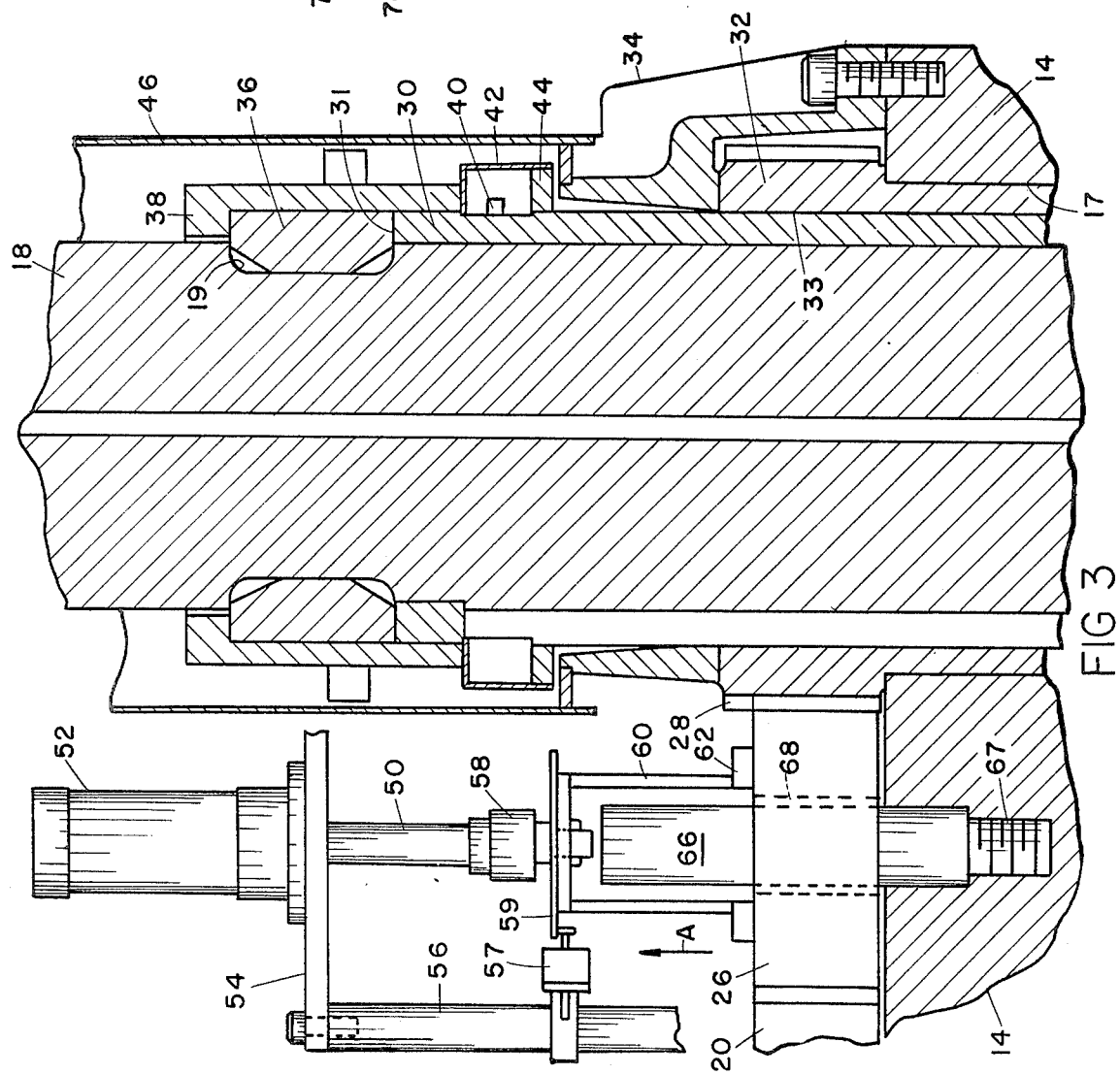
FIG. 3 is a fragmentary cross-sectional view of another of the tie bar adjustment mechanisms of the present invention.

Referring to FIG. 3, there is shown the lower right (as seen in FIG. 1) tie bar adjustment mechanism for threadless tie bar 18. Tie bar 18 extends through an aperture 17 in the lower right corner of rear plate 14 and is surrounded by a cylindrical sleeve 30 which is fitted over and extends longitudinally along the tie bar 18 a length sufficient for adjusting the tie bar. Sleeve 30 includes a spiral thread 35 on its exterior surface as seen in FIG. 1. Aperture 17 is large enough to accommodate the externally threaded sleeve 30 as well as an internally threaded adjustment nut 32 threadably fitted over the sleeve and held in place against the rear surface 14' of plate 14 by means of a circular retainer plate 34. The rear 31 of threaded sleeve 30 abuts against a split retainer ring 36 fitted within a groove 19 in the tie bar and is held in position thereby by a cap 38 secured to the tie bar.

The forces involved in locking up of the die casting machine tend to urge plate 14 rearwardly (upwardly in FIG. 3) which in turn transmits a compressive force to threaded sleeve 30 by means of the internally mating threads 33 on adjustment nut 32 to the sleeve 30 which engages retainer 36 of the tie bar placing the tie bar 18 in tension. The tie bars tie plates 12 and 14 together during lockup while a ram cylinder (not shown) mounted on rear plate 14 forces the movable plate 13 to a lockup position for casting. The adjustment of the tie bar tension during lockup is achieved with the locking pressure relieved and the rotation of adjustment nut 32 which slides sleeve 30 inwardly or outwardly with respect to the back plate 14 thus adjusting the tension on tie bar 18 by increasing or relieving the compressive force on sleeve 30 during locking up of the die casting machine. In order to measure the compressive force on the sleeve which is directly related to the tension on the tie bar, a resistive strain gauge 40 is mounted to the exterior surface of the threaded sleeve 30 by conventional strain gauge mounting techniques and is coupled to the electrical circuit shown in FIG. 5 as discussed in greater detail below. The strain gauge is protected by a sheet metal shield 42 secured to a mounting ring 44 in turn secured to the threaded sleeve while an exterior sheet metal shield 46 encloses the cap 38 and the space between retainer plate 34 and the exterior threaded sleeve 30. It is noted here that the retainer plate 34 confines the axial motion of the adjustment nut 32 but does prevent rotation of the nut for adjustment of the tie bar tension.

Figure 2:
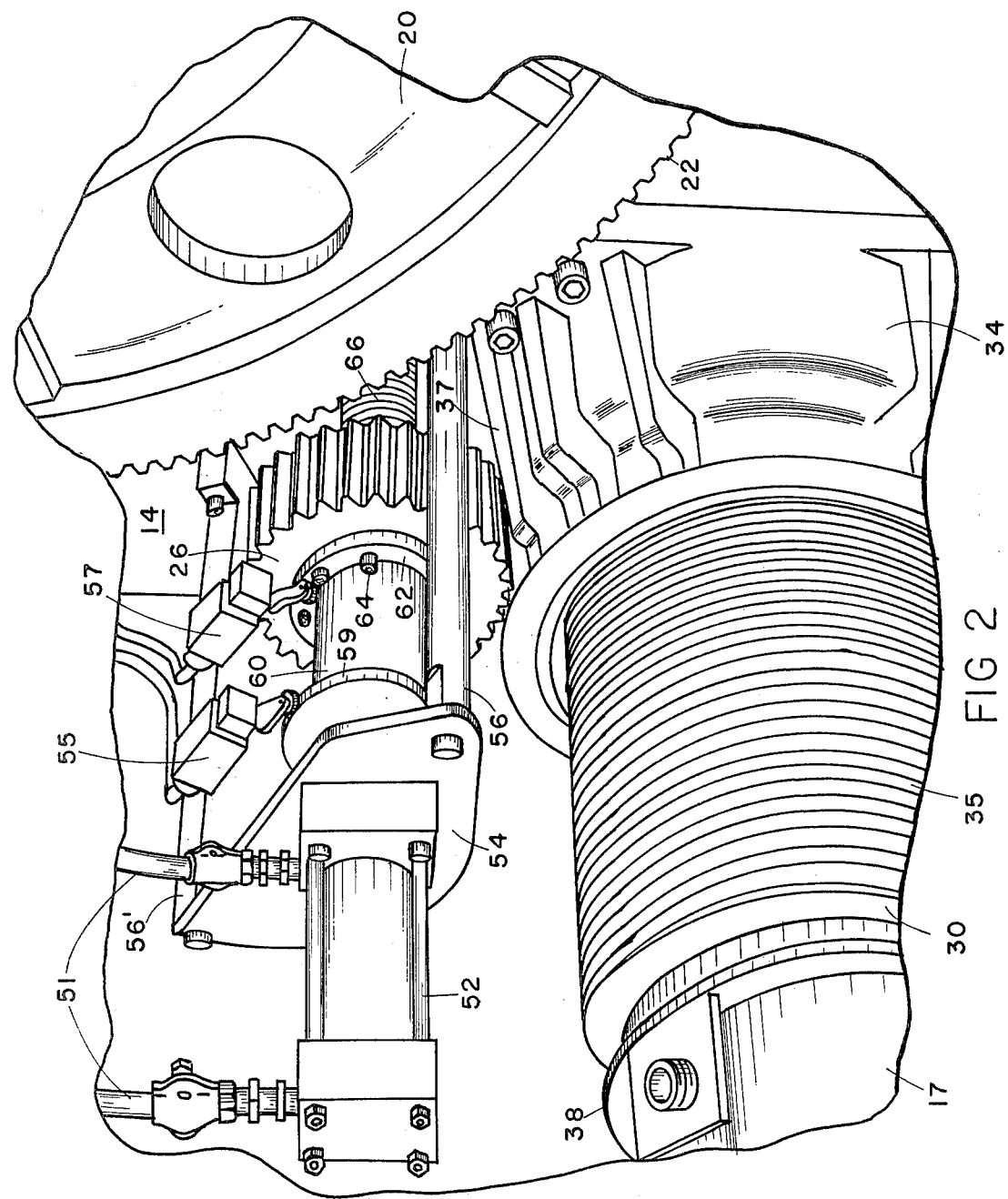
FIG. 2 is an enlarged fragmentary perspective view of one of the tie bar adjustment mechanisms shown in FIG. 1.

The adjustment nut 32 includes exterior beveled teeth 28 around its periphery and is rotated by the bull gear 20 selectively coupled to the adjustment nut by a disengagable idler gear 26. Retainer plate 34 includes an opening 37 (FIG. 2) exposing the teeth of the adjustment nut and permitting the idler gear 26 to engage the teeth of the adjustment nut. The idler gear mechanism is also seen in FIG. 2 showing the idler gear 26 associated with tie bar 17 in a disengaged position. In FIG. 3, the idler gear associated with tie bar 18 is shown in its engaged position whereby rotation of bull gear 20 rotates the idler gear 26 which in turn engages the teeth on nut 32 for adjustment of the tie bar tension.

Each of the idler gears 26 can be disengaged by moving the idler gear rearwardly as indicated by arrow A in FIG. 3 to a position out of engagement with the bull gear 20 as seen in FIG. 2. To achieve this, the idler gears 26 are mounted to the shaft 50 of a hydraulic cylinder 52 in turn supported by a mounting plate 54 by means of rods 56 and brackets 56' (FIG. 2). A slip coupling 58 (FIG. 3) couples the end of shaft 50 to a cylindrical mounting bracket 60 in turn secured to the rear surface of each of the idler gears 26 by means of a mounting ring 62 and bolts 64 (FIG. 2). This coupling permits rotation of the idler gear 26 without rotation of the cylinder shaft 50. Idler gear 26 is also supported by a pinion shaft 66 with a threaded end 67 secured to backing plate 14. Shaft 66 slidably guides the idler gear 26 mounted thereon by a bushing 68 while permitting rotation of the gear. Naturally, the diameters of gears 20, 26 and the tie bars surrounded by adjustment nuts 32 and the spacing of their axis of rotation can be varied from machine to machine. The idler gear will be positioned on an axle for rotation typically located between the bull gear and the adjustment nut for transmitting the motion of the bull gear to the adjustment nut only when the idler gear is engaged.

The stroke of cylinder 52 is such that when shaft 50 is fully extended, the idler gear is in engagement between bull gear 20 and adjustment nut 28 as seen in FIG. 3 and when in a retracted position, moves the idler gear into a disengaging position as seen in FIG. 2. The hydraulic cylinder 52 is provided with pressure by means of a pair of hydraulic lines 51 (FIG. 2) in a conventional manner and a pair of limit switches 55 and 57 provide rearward and forward limit signals to the control circuit in response to engagement of a limit switch actuator plate 59 coupled to the rear of cylindrical bracket 60.

Figure 5:
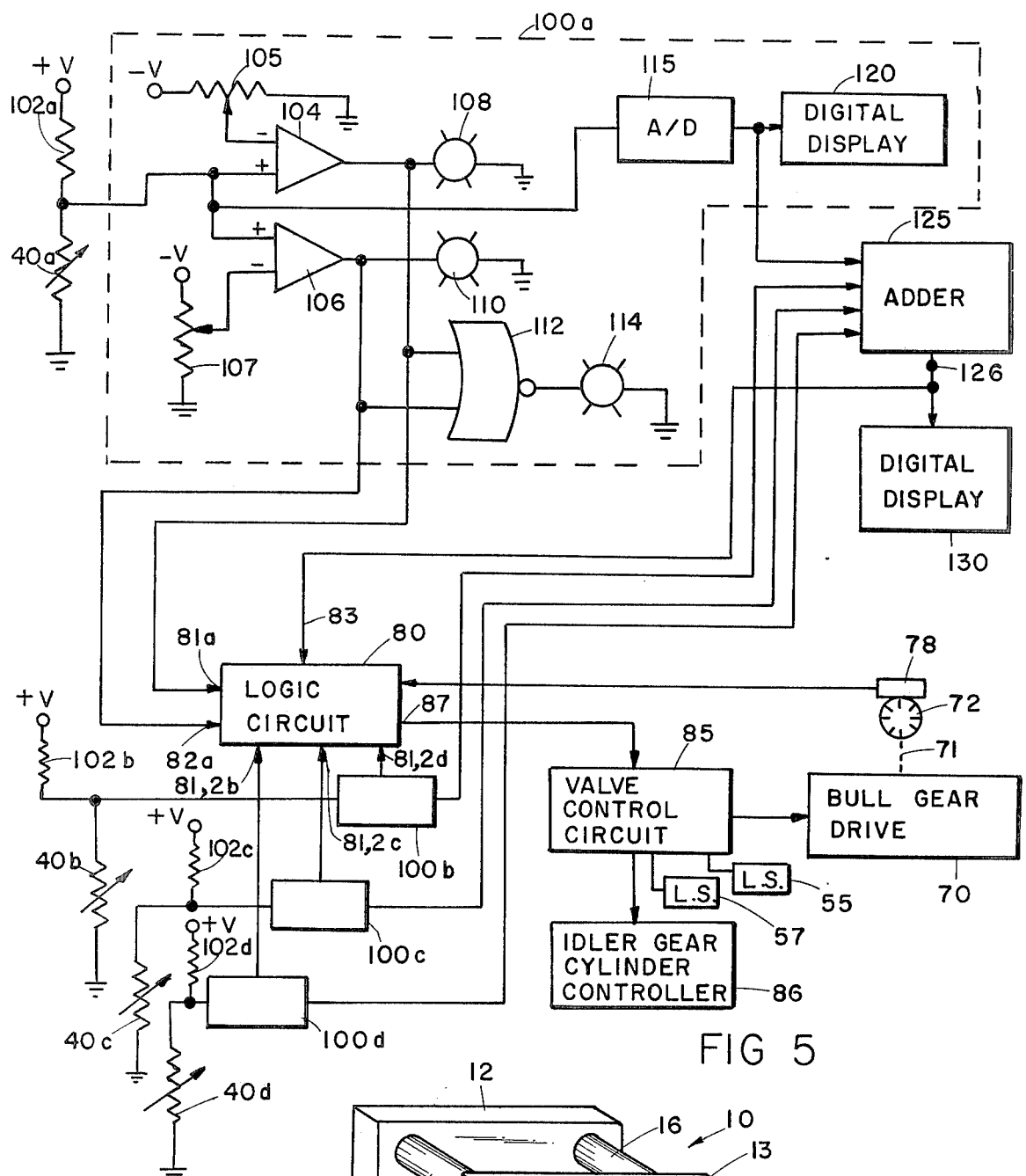
FIG. 5 is an electrical circuit diagram partly in block and schematic form of the electrical control system for the tie bar adjustment mechanism of the present invention.
Figure 4:
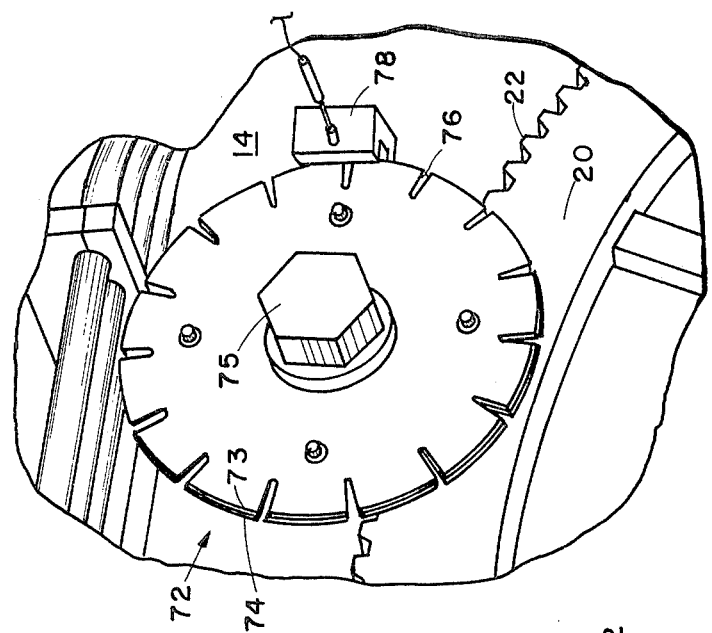
FIG. 4 is a fragmentary perspective view of a sensor employed in the system of the present invention.

Before describing the automatic mode of operation incorporating the structure of FIGS. 4 and 5, a brief description of the operation of the adjustment mechanism that can be accomplished with manual control of the bull gear drive and cylinders 52 for a typical cycle of adjustment is presented. Initially, it is noted that adjustment always takes place when the machine is not locked up, thereby relieving tension on the tie bars so that the threaded sleeve can easily be adjusted. In order to tighten one of the tie bars, for example, the cylinder 52 associated with the tie bar to be tightened is actuated to disengage its associated idler gear 26. The bull gear is then driven to loosen the remaining three tie bars typically by rotating the bull gear one tooth at a time. Next, the disengaged idler gear is engaged and all four of the tie bar adjustment nuts are tightened which in effect returns the three to their original position but tightens the one which was not loosened. The machine is then run through a cycle of operation and the lockup forces are read from the strain gauge readouts. If additional adjustments on the tie bar or on the remaining tie bars are necessary, they can be made by repeating the sequence. The sequence is reversed to loosen one or more of the tie bars. It has been found that this procedure leads to more reproducible and uniform results than simply adjusting only the tie bars which are to be loosened or tightened. Having briefly described the mechanical operational sequence for the tie bar adjustment mechanism, a description of the automatic control system for maintaining the tie bars within prescribed limits individually and collectively is now described in conjunction with FIGS. 4 and 5.

Initially, it is noted that the bull gear 20 is driven by suitable a motor and gear drive shown as block 70 in FIG. 5. It is desired to move the bull gear an incremental rotational distance which motion is detected by a slotted disc assembly 72 which includes a pair of discs 73 and 74 sandwiched together as best seen in FIG. 4 and rotatably mounted to backing plate 14 by means of an axle 75. Discs 73 and 74 are rotated by a drive gear (shown schematically as element 71 in FIG. 5) mounted on shaft 75 and coupled to the discs and engaging the teeth 22 of the bull gear. The slotted discs 73 and 74 include a plurality of radially inwardly extending angularly spaced slots 76. Discs 73 and 74 can be rotated with respect to one another to define slots 76 to provide a signal representing the movement of the bull gear by one tooth when a photoelectric detector 78 is positioned on the peripheral edge of the disc assembly 72 is employed to detect movement of slots 76 thereby. Detector 78 is conventional and includes a light source on one side of discs 73, 74 and a photo cell on the other side such that a signal is developed when light is passed through one of the slots. The diameter of the drive gear and the spacing of slots 76 are selected such that a signal is developed by detector 78 when the bull gear rotates an angular distance corresponding to one tooth. The signal from the photoelectric detector 78 is fed to a solid state logic circuit 80 as are other input signals. The logic circuit 80 responds to the various input signals as described below to provide an output control signal to a valve control circuit 85 which responds to provide signals controlling the hydraulic idler gear cylinders 52 by means of a controller 86 and an output signal to actuate the bull gear drive 70.

The remaining circuitry shown in FIG. 5 is suitably located in a control cabinet with an operator accessible control panel in order to provide monitor information as to whether or not the tension on each of the tie bars is within prescribed limits. A control and display circuit 100 (FIG. 5) is associated with each of the tie bars. For purposes of identification, the suffixes a, b, c, and d are employed in FIG. 5 to indicate identical circuits associated with each of the tie bars 15 through 18, respectively. In the circuit 100a, the strain gauge 40a affixed to the tie bar is part of a resistive divider network coupled between a regulated +V supply to ground and including a series current limiting resistor 102a. The junction of resistor 102a and the resistive strain gauge 40a is coupled to the positive input terminal of a pair of comparators 104 and 106 defining upper and lower limit detectors. A negative input terminal of comparator 104 is coupled to a −V reference supply through an adjustable potentiometer 105 between the −V supply and ground while the negative input terminal of comparator 106 is coupled to a potentiometer 107 coupled between the −V supply and ground. Resistor 105 is selectively adjustable for defining the upper limit of the tie bar tension while resistor 107 is adjustable to define the lower limit. The output signals from the comparators 104 and 106 are applied to an upper limit indicator light 108 and a lower limit light 110 for illuminating these lights when the upper and/or lower limits are reached. The signals from comparators 104 and 106 are also applied to input terminals 81 a–d and 82 a–d of logic circuit 80. When the lower tie bar tension limit has been reached, for example, the logic circuit 80 responds to this information on input 82 for providing a control signal to valve control circuit 85 via conductors 87. The valve control circuit 85 responds to operate the bull gear drive 70 and cylinders 52 in the sequence necessary for adjusting the individual tie bar whose tension is low. The output signals from comparators 104 and 106 are also applied to a NOR gate 112 having an output terminal coupled to an indicator light 114 which is illuminated to indicate when the tie bar tension is within its desired range.

The control panel also includes a digital display 120 which provides the operator with a continuous digital readout of the tie bar tension by applying the signal from the strain gauge 40 through an A/D converter 115 to the digital display 120. The information from each of the A/D converters in each of circuits 100 a–d is applied to four inputs of a four input digital adder 125 having its output terminal 126 coupled to a digital display 130 for displaying the total lockup force on the die casting machine. Thus, the operator can monitor individual tie bar tensions as well as the overall tension. The signal from adder 125 is also applied to input terminal 83 of logic circuit 80 which circuit also includes upper and lower total tension limit comparators in a circuit similar to that used in circuit 100a such that in the event the total tension is lesser or greater than the desired amount, the tie bars will be equally adjusted to provide the desired lockup force to the die casting machine. Circuits 100 b, c, and i likewise apply a pair of inputs to input terminal pairs 81 b–d, 82 b–d to the logic circuit 80 such that the logic circuit receives information for each of the tie bars.

Logic circuit 80 is of conventional design to provide control output signals at conductors 87 which are applied to the input terminals of the valve control circuit 85 for sequencing the adjustment system as noted above to individually adjust one or more of the tie bars to maintain the tie bars within the prescribed tension limits programmed through resistors 105 a–d and 107 a–d and corresponding resistors for the cumulative force contained within logic circuit 80. Circuit 85 converts the digital logic signals into signals used by the bull gear drive 70 and controller 86 for actuating the bull gear and hydraulic cylinders 52. Controller 86 includes a plurality of valves coupled between a source of pressurized hydraulic fluid and the cylinders for controlling the motion of the cylinders. The limit switches 55 and 57 (FIG. 2) for each adjustor are coupled to circuit 85 to provide feedback control for the cylinders.

Although the preferred embodiment of the present invention discloses a fully automatic system for providing individual adjustment of each of the tie bars within prescribed limits and the adjustment of all the tie bars to provide total tie bar tension during lockup, the invention encompasses the use of semi-automatic or manual modes of operation using the adjustment system of the present invention. The semi-automatic mode of operation can be accomplished by providing, for example, manually actuated switches to provide input signals to the valve control circuit 85 such that when the display indicates a tie bar needs adjustment, the operator can cycle the valve control circuit as required for adjustment of an individual tie bar. These and various other modifications to the preferred embodiment of the invention described and disclosed herein will be apparent to those skilled in the art and will fall within the spirit and scope of the invention as defined by the appended claims.

The embodiments of the invention in which an exclusive property or privilege is claimed are defined as follows:

1. In a die casting machine including front and rear end plates, a plurality of tie bars extending between said end plates, a traveling plate slidably positioned on said tie bars for movement between said end plates, each of said tie bars secured to one end plate by externally threaded sleeves positioned over one end of the tie bars, rotatable threaded adjustment nuts coupled to said one end plate and engaging said threaded sleeves for adjustment of said tie bars, centrally positioned adjustment means for rotating said adjustment nuts, the improvement comprising:

means for selectively coupling one or more threaded adjustment nuts with said adjustment means and control means including a control circuit coupled to said selective coupling means for automatically selectively adjusting the tension of said tie bars within prescribed limits.

2. The die casting machine as defined in claim 1 wherein said adjustment nuts include external gear teeth and said adjustment means comprises a bull gear and idler gears for selectively coupling each of said adjustment nuts to said bull gear and said control means includes means for moving each of said idler gears between a first position engaging said bull gear and an associated adjustment nut and a second position disengaging said bull gear and said associated adjustment nut.

3. The die casting machine as defined in claim 2 wherein said means for moving said idler gears includes shaft means for rotatably and slidably mounting each of said idler gears to said one end plate for movement between said first and second positions.

4. The die casting machine as defined in claim 3 wherein said moving means for each of said idler gears further includes a cylinder coupled between said one end plate and said idler gear for sliding said idler gear on said shaft means between said first and second positions.

5. The die casting machine as defined in claim 4 and further including drive means for said bull gear and wherein said control circuit is coupled to said cylinders and to said bull gear drive means for selectively adjusting said tie bars.

6. A die casting machine including front and rear end plates, a plurality of tie bars extending between said end plates, a traveling plate slidably positioned on said tie bars for movement between said end plates, each of said tie bars secured to one end plate by externally threaded sleeves positioned over one end of the tie bars, rotatable threaded adjustment nuts coupled to said one end plate and engaging said threaded sleeves for adjustment of said tie bars, centrally positioned adjustment means for rotating said adjustment nuts wherein said adjustment nuts include external gear teeth and said adjustment means comprises a bull gear and idler gears for selectively coupling each of said adjustment nuts to said bull gear and means for moving each of said idler gears being a first position engaging said bull gear and an associated adjustment nut and a second position disengaging said bull gear and said associated adjustment nut, and wherein said means for moving said idler gears includes shaft means for rotatably and slidably mounting each of said idler gears to said one end plate for movement between said first and second positions and wherein said moving means for each of said idler gears further includes a cylinder coupled between said one end plate and said idler gear for sliding said idler gear on said shaft means between said first and second positions, drive means for said bull gear and a control circuit coupled to said cylinders and to said bull gear drive means for selectively coupling one or more threaded adjustment nuts with said bull gear for selectively adjusting said tie bars, wherein said control circuit comprises means for detecting a parameter directly relating to and representing the tension of said tie bars, a source of signals representing predetermined tension limits for said tie bars, circuit means coupled to said detector means and to said source to provide an output control signal when the detected tie bar tension bears a predetermined relationship to the predetermined tension limits, and means for actuating said cylinders and bull gear drive means for adjusting said tie bars to maintain their tension within said predetermined tension limits.

7. A system for adjusting the bars in a tie casting machine comprising:

means for detecting a parameter directly relating to and representing the tension on the tie bars of a die casting machine;

a source of signals representing predetermined tension limits for the tie bars;

circuit means coupled to said detector means and to said source to provide an output control signal when the detected tie bar tension bears a predetermined relationship to the predetermined tension limits; and tie bar adjustment means including means for actuating said adjustment means coupled to said circuit means and responsive to said control signal therefrom for adjusting said tie bars to maintain their tension within said predetermined limits.

8. The system as defined in claim 7 wherein said tie bar adjustment means includes an adjustment nut associated with each tie bar and including gear teeth for rotating said nut to adjust the tension on the tie bar, and gear means selectively engaging one or more of said adjustment nuts for adjusting the tie bar tension.

9. The system as defined in claim 8 wherein said gear means comprises a bull gear centrally positioned with respect to said tie bars, and a plurality of idler gears and means movably mounting said idler gears between said adjustment nuts and said bull gear for selectively coupling said bull gear to one or more of said adjustment nuts.

10. The system as defined in claim 9 wherein means for movably mounting said idler gears comprises shaft means for rotatably and slidably mounting each of said idler gears to an end plate of the die casting machine and cylinder means coupled between each of said idler gears and the end plate for moving said idler gears between engaging and disengaging positions.

11. The system as defined in claims 7 or 10 wherein said detecting means comprises strain gauges coupled to detect the tension of each of the tie bars.

12. The system as defined in claim 11 wherein said source of signals representing predetermined tension limits comprises adjustable voltage sources for selecting and providing output signals representing desired tension limits for each of the tie bars.

13. The system as defined in claim 12 wherein said circuit means includes means for comparing signals from said detecting means with signals from said adjustable voltage sources for each of the tie bars, and logic circuit means coupled to said comparing means for developing said output control signal when a comparison is made indicating that at least one tie bar has reached a predetermined tension limit.

14. The system as defined in claim 13 and further including additional detecting means coupled to said logic circuit means for detecting incremental motion of said bull gear and wherein said logic circuit means responds to signals from said additional detecting means to control said bull gear drive means to provide incremental adjustment of a tie bar.

15. A tie bar adjustment system for a die casting machine having end plates with a plurality of tie bars extending between the end plates comprising:

rotatable adjustment means coupled to one of the end plates and associated with each of the tie bars for adjusting the tension of the tie bars;

drive means centrally positioned with respect to the tie bars to provide a rotary drive for the selective rotation of each of said adjustment means;

detector means for detecting a parameter representative of the tension on said tie bars; and control means coupled to said detector means and to said drive means for selectively coupling said drive means to said adjustment means associated with each of said tie bars so that any combination of one or more tie bars can be simultaneously adjusted for maintaining tie bar tension at desired levels.

16. The system as defined in claim 15 wherein each of said adjustment means comprises an adjustment nut having external gear teeth extending around its periphery, said drive means comprises a bull gear rotatably mounted to the one end plate of an idler gear positioned between said bull gear and each of said adjustment nuts and movable between engaging or disengaging positions for selectively coupling said bull gear to one or more adjustment nuts.

* * * * *

UNITED STATES PATENT AND TRADEMARK OFFICE
CERTIFICATE OF CORRECTION

PATENT NO. : 4,256,166
DATED : March 17, 1981
INVENTOR(S) : Edgar D. Prince

It is certified that error appears in the above—identified patent and that said Letters Patent is hereby corrected as shown below:

Column 3, line 28, "thereby" should read -- therein --.

Column 6, line 31, "i" should read -- d --.

Column 7, line 62, "being" should read -- between --.

Column 8, (claim 7), line 1, "the bars in a tie casting" should read --tie bars in a die casting --.

Signed and Sealed this

Fourth Day of August 1981

[SEAL]

Attest:

GERALD J. MOSSINGHOFF

Attesting Officer　　　Commissioner of Patents and Trademarks